June 21, 1966 A. FEINER 3,257,513

COMMUNICATIONS SWITCHING NETWORK

Filed Jan. 22, 1963 8 Sheets-Sheet 1

INVENTOR
A. FEINER
BY [signature]
ATTORNEY

June 21, 1966 A. FEINER 3,257,513

COMMUNICATIONS SWITCHING NETWORK

Filed Jan. 22, 1963 8 Sheets-Sheet 3

TRUNK LINK NETWORK TLN0

June 21, 1966 A. FEINER 3,257,513

COMMUNICATIONS SWITCHING NETWORK

Filed Jan. 22, 1963 8 Sheets-Sheet 5

TRUNK LINK NETWORK TLNO

COMMUNICATIONS SWITCHING NETWORK

Filed Jan. 22, 1963 8 Sheets-Sheet 7

United States Patent Office 3,257,513

Patented June 21, 1966

3,257,513

COMMUNICATIONS SWITCHING NETWORK

Alexander Feiner, Holmdel, N.J., assignor to Bell Telephone Laboratories, Incorporated, New York, N.Y., a corporation of New York Filed Jan. 22, 1963, Ser. No. 253,083
13 Claims. (Cl. 179—18)

This invention relates generally to communications switching networks and more particularly to large, multistage, communication networks which are adaptable to electronic control.

Telephone switching systems generally provide for the selective interconnection of lines and trunks. Control of switching systems is characterized as progressive, as in the well-known step-by-step switching system, or centralized, as in the well-known Bell System crossbar switching systems. Switching systems having centralized control normally comprise a switching network, through which interconnection of lines and trunks is accomplished; common control circuitry for determining and generating commands; supervisory circuitry for monitoring and controlling the operations of line and trunk circuits; and access circuitry for selectively energizing selected portions of the switching system in accordance with commands generated by common control circuitry.

The number of lines and trunks which may be efficiently served by a switching system is dependent upon the cooperative efficiencies of the above system components. Prior art switching systems have generally been limited to 20,000 lines and associated trunks per network due to a decrease in efficiency of system operation when this number of lines was exceeded. This invention is directed to a switching network configuration suitable for use with a greatly enlarged number of lines and trunks, which configuration makes advantageous use of highly efficient common control circuitry and network access circuitry.

The switching network of a switching system provides selectable connecting paths between the lines and trunks served by the switching system. Lines provide access to the switching network from local sources of communication, such as telephone stations and data terminal equipment. Trunks provide access to the network from other remote switching networks. Each demand for a connection through a network is termed a call, and a plurality of calls is known as traffic. Among the various types of traffic which must be processed by a switching system are line to line calls, trunk to trunk calls, line to trunk calls and trunk to line calls. In addition, administrative traffic, requiring connection of lines or trunks to tone sources, signal transmitters, signal receivers, coin supervisory circuits, ringing circuits, maintenance circuits and the like, must be processed. The amount of traffic through a switching network is a direct function of, among other factors, network size and the rate at which calls are initiated from the lines and trunks terminated on the network.

Switching system common control circuitry, which selects and directs the establishment of connecting paths through the switching network, may comprise a multiplicity of identical control units or a single control unit. Multiple control units are provided when the speed at which a single control unit can process a call is insufficient to allow processing of all traffic through a switching network without unsatisfactory delays in sequential call completion. An example of a multiple control unit switching system is the well-known No. 5 crossbar switching system wherein multiple "markers" are utilized to provide efficient traffic processing.

On the other hand, electronic, data processing type, control units have been developed which obviate, except for system reliability, the need for multiple control units and which individually are capable of processing a massive amount of traffic.

The switching network access circuitry through which the common control circuitry exerts control over the switching network generally is of a space divided type, a time divided type or a combination thereof. Where multiple control units are utilized, the network access circuitry is space divided so as to avoid conflicts between individual control units as they seek to exert control over the same portion of the switching network. Such access circuitry generally comprises a lockout type circuit which prevents connection of more than one control unit to any portion of the network at any given time. As a result of this lockout operation, one control unit may be forced to await the release of another control unit before completing its function, thereby delaying call completion and further delaying the processing of subsequent calls.

A switching system of the type with which my invention may be utilized may be characterized by the asynchronous time sharing of a high-speed, command generating circuit by a large number of diverse, low-speed, command executing circuits. The network access circuitry of this type of system does not require lockout type circuits to space divide multiple control units since there are no competing control units. Interference between multiple control units and resultant delays in traffic processing are therefore avoided.

As previously mentioned, the number of lines which may be efficiently served by a single switching network is determined by the efficiency of cooperation between the switching network, the common control circuitry and the network access circuitry. The traffic generated by 20,000 lines and associated trunks has generally, heretofore, been the maximum amount of traffic that could be efficiently processed by prior art switching systems. Electronic telephone systems of the type discussed above are capable of processing traffic generated by over 65,000 lines and associated trunks A switching network through which over 65,000 lines and associated trunks may be selectively interconnected presents many problems not previously encountered in the smaller switching networks of the prior art.

It is, therefore, a general object of this invention to fully utilize the extensive traffic processing capabilities of a high-speed, common control circuit in association with time-divided, network access circuitry by means of a large, highly flexible and versatile switching network through which all types of traffic may be completed.

Switching networks have been characterized as unidirectional, bidirectional or a combination thereof. In a unidirectional switching network, connections are established in only one direction. Separate switching networks are provided for originating traffic and terminating traffic. These separate networks are interconnected to provide for line to line and for trunk to trunk traffic. Each bidirectional input circuit (one from which calls may originate and at which calls may terminate) must be terminated twice, i.e. on both originating and terminating networks, to provide for the completion of both originating and terminating calls.

A bidirectional switching network permits the establishment of connections in either direction, and only one such network need be provided for completion of both originating and terminating types of calls. Bidirectional input circuits to a bidirectional switching network require only one termination since, in such a network, it makes no difference in which direction a connection must be established. However, the use of unidirectional input circuits, such as incoming and outgoing trunks, is not precluded in a bidirectional network.

Some switching networks, such as that of the well-known step-by-step switching system, are fully unidirectional. However, most prior art switching networks exhibit a configuration having both unidirectional and bidirectional characteristics. A combined unidirectional and bidirectional switching network is exemplified in the well-known No. 5 crossbar switching system. In this network, trunk to trunk connections can be established through the network in one direction only, whereas all other connections may be established in either direction. Trunks which may be used in trunk to trunk connections accordingly require two terminations—one termination for traffic originating through the trunk and another termination for traffic terminating through the trunk.

The presence of any unidirectional characteristic in a switching network serving the number of lines and trunks which are contemplated by this invention would compound the dual termination requirement for bidirectional input circuits so as to increase the number of network input terminals required for full flexibility beyond all proportions.

It is, accordingly, another object of this invention to eliminate all undesirable unidirectional characteristics from a large switching network configuration and to thereby more efficiently utilize all input terminals thereof.

The original installation of a switching system is seldom, if ever, of maximum size. Generally allowance is made for future growth in switching network terminations. Further, in a switching network of the size contemplated herein, it is highly probable that traffic patterns within the network will change from time to time. For example a network which is originally designed and engineered to process a majority of line to line traffic, as compared to other types of traffic, may very well be called upon to process a majority of line to trunk traffic or trunk to trunk traffic at some future time due to variation in the character of the lines and trunks served by the network or the addition of other lines and trunks thereto.

The procedures for rearranging traffic patterns in prior art networks have generally required extensive circuit changes in several portions of the network. If prior art networks were sufficiently enlarged to assume the relatively massive proportions of the switching network contemplated herein, the aforenoted circuit changes would be multiplied accordingly. Traffic pattern rearrangements in such networks would become excessively ponderous and time consuming.

Accordingly, it is a further object of this invention to facilitate and simplify the rearrangement of traffic patterns within a switching network in accordance with changes in the ratio between the various types of traffic for which the switching network provides connections.

These and other objects of the invention are attained in one specific illustrative embodiment thereof wherein a multistage, space-division, switching network is divided into serially interconnected, bidirectional, sub-networks. Lines are terminated on the input terminals of a first type of sub-network (called herein a line link network) which provides for the selective interconnection of all lines terminated thereon via wired junctor interconnections of selected output terminals thereof (designated line junctor terminals). Trunks are terminated on the input terminals of a second type of sub-network (called herein a trunk link network) which provides for the selective interconnection of all trunks terminated thereon via wired junctor interconnections of selected output terminals thereof (designated trunk junctor terminals). The serial combination of a line link network and a trunk link network provides for the selective interconnection of all lines and trunks terminated thereon via wired junctor connections between selected line junctor terminals and selected trunk junctor terminals.

All line junctor terminals and trunk junctor terminals are located, in accordance with an aspect of my invention, at a central cross connection facility (called herein a junctor grouping frame) which provides for full flexibility of interconnection thereof in accordance with current network traffic requirements.

A plurality of line link networks and trunk link networks may be provided. Selected line junctor terminals and trunk junctor terminals of each respective line link network and trunk link network are connected via junctor cross connections on the junctor grouping frame to selected line junctor terminals and trunk junctor terminals of all other line link networks and trunk link networks in accordance with existing traffic requirements to provide full flexibility of sub-network interconnection.

By means of the junctor grouping frame, selected line junctor terminals are interconected via line junctor links, each of which includes facilities (designated a line junctor circuit) whereby supervisory services for line to line connections may be accomplished. When, as a result of total network size or network traffic patterns, a large amount of line to line traffic must be switched, I provide, in accordance with another aspect of my invention, a third type of sub-network (called herein a line junctor link network) on which selected line junctor links are terminated, to increase the flexibility of line junctor terminal interconnection. A trunk junctor link network may be similarly provided to increase the flexibility of trunk junctor terminal interconnection.

In this specific illustrative embodiment of my invention common control circuitry advantageously selects specific paths through the network. To implement this selection function, a record of the busy and idle states of network interconnection links and a record of the entire path of every established or reserved network connection may be maintained by the common control circuitry. Commands, which comprise addresses and orders defining new network connections, are determined by the common control and transmitted to network control units which control the establishment of new connections through the network and the release of existing connections through the network.

In accordance with a feature of my invention, line to line calls are routed via interconnected line junctor terminals thereby bypassing the switching stages of the trunk line networks.

In accordance with a further feature of my invention, trunk to trunk calls are routed via interconnected trunk junctor terminals thereby bypassing the switching stages of the line link networks.

Switching networks have been characterized as folded and nonfolded. A fully folded network is one wherein all lines and trunks are terminated on the input terminals of the first switching stage thereof. The output or junctor terminals of the last switching stage are permanently interconnected. Interconnection of lines and trunks is accomplished by establishing a U-shaped path which includes a first connection through the network from a first stage input terminal to a last stage output terminal, the permanent connection from the last stage output terminal to another last stage output terminal and a second connection through the network from the other last stage output terminal to a first stage input terminal. Full bidirectional flexibility of interconnection of lines and trunks is available in a fully folded network. However, the requirement of two connections through the network for the completion of each call exerts some limitation upon the traffic handling capacity of this type of network.

A fully nonfolded network is one wherein lines and trunks are terminated at opposite ends of the network. Lines generally are terminated on the first stage of the network, and trunks generally are terminated on the last stage of the network. A connection between a line and a trunk is accomplished by establishing a single path through the network from the line to the trunk. A fully nonfolded network provides for bidirectional flexibility in connecting lines to trunks. However, this type of network does not provide for line to line connections and trunk to trunk connections.

In accordance with another feature of my invention a first partially folded network (the line link network) and a second partially folded network (the trunk link network) are serially connected at selected output terminals (junctor terminals) thereof, to provide full bidirectional flexibility of interconnection of lines and trunks.

In accordance with a further feature of my invention, all trunk junctor terminals and line junctor terminals may be selectively interconnected in accordance with current traffic requirements by means of readily rearrangeable junctor cross connections at a single, central location.

It is still another feature of my invention that a third sub-network is interposed in the output junctor connections of one of the other sub-networks for increasing the amount of traffic that may be switched between the input terminals of that one sub-network without utilizing any of the facilities of the other sub-network. Thus it is a feature of my invention that line to line traffic may be switched through a line sub-network, a junctor sub-network, and again through the line sub-network without utilizing the trunk sub-network of the switching system.

Further it is a feature of my invention that the junctor terminals of this third sub-network also all be available at the single cross-connection frame for interconnection with line junctor terminals of the line sub-network.

The above and other objects and features of my invention will be more readily understood from the following description when read with respect to the drawing in which:

FIG. 1 is a block diagram of one illustrative switching network organized in accordance with my invention;

FIGS. 2 and 3, when placed side by side, are a perspective type block diagram illustrating the organization of a typical line link network;

FIGS. 4 and 5, when placed side by side, are a perspective type block diagram illustrating the organization of a typical trunk link network;

The following description of one illustrative embodiment of my invention is divided into a number of parts. Following a general introduction including a discussion of the type of network switching devices that may be advantageously employed there is set forth a description of a block diagram of a multistage network incorporating my invention including distinct sub-networks. Following this there is set forth a description of the basic switching grid units of which the various sub-networks of this embodiment are composed. Lastly there are set forth, in distinct sections, descriptions of each of the three sub-networks of this specific embodiment.

INTRODUCTION

A communication switching network is comprised of a plurality of selectively energizable switching devices which, when energized, connect associated transmission paths through the switching network. Prior art switching networks have utilized both electronic and electromechanical switching devices as transmission path connecting elements. One example of an electromechanical switching device, which may be advantageously used in the illustrative switching network to be described herein, is disclosed inter alia in an article "The Ferreed—A New Switching Device" by A. Feiner et al., Bell System Technical Journal, January 1960 at page 1 and my copending patent application Serial No. 862,811, filed December 30, 1959. This device is known as the "ferreed." An arrangement for selectively controlling the operation of a coordinate array of ferreeds is disclosed in the copending patent application of W. S. Hayward, Jr., Serial No. 206,055, filed on June 28, 1962, now Patent 3,110,772 issued November 12, 1963. Although the switching network described herein below may advantageously be comprised of this type of switching device, other electromechanical and electronic switching devices are equally suitable for use in a switching network organized in accordance with my invention.

*Switching network of my invention (FIG. 1)*

Figure 1:
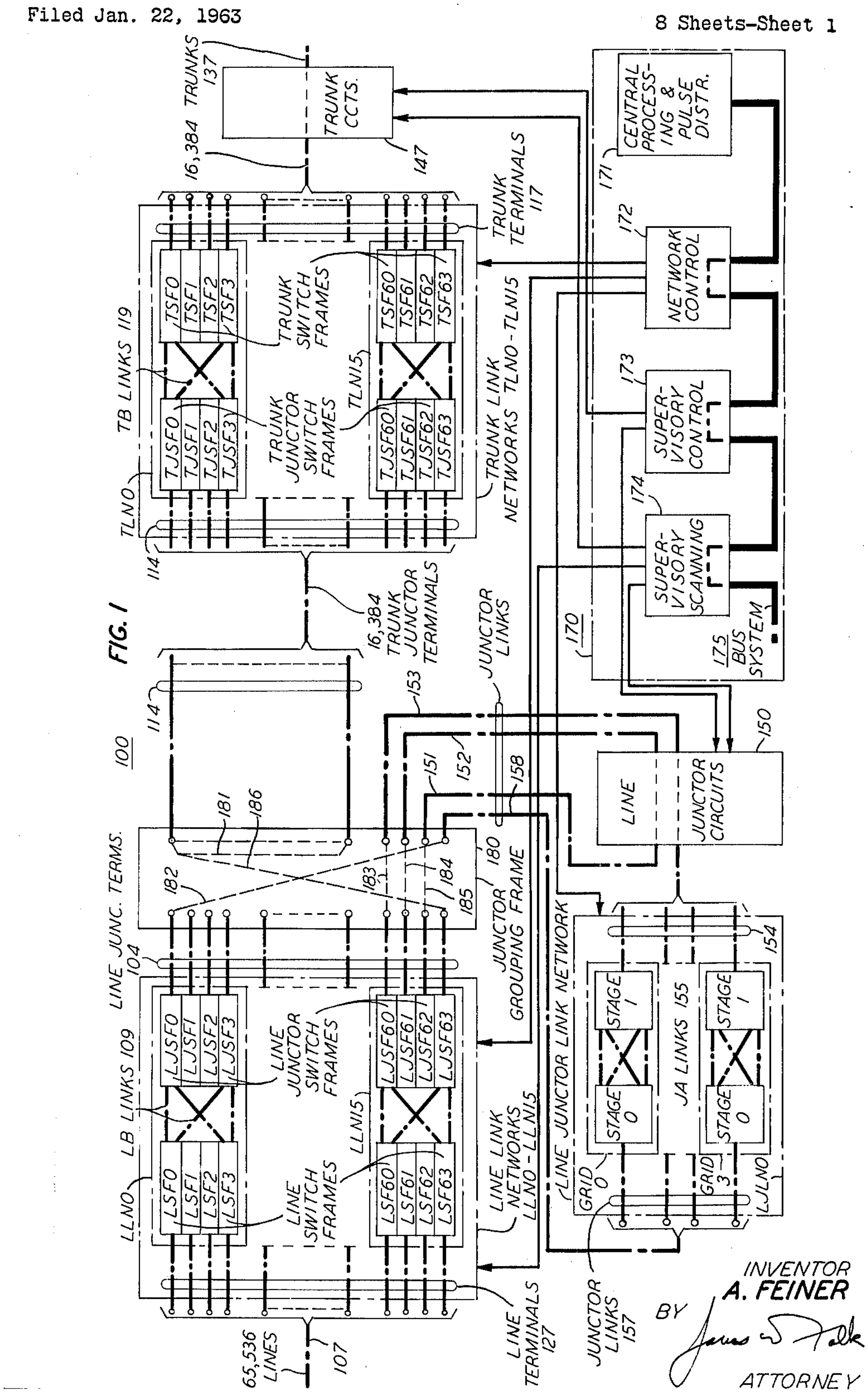

FIG. 1 is a block diagram of an illustrative embodiment of a switching network 100 organized in accordance with my invention and of its associated control and supervisory circuitry 170. The illustrative switching network 100 provides for the selective, bidirectional, interconnection of up to 65,536 lines 107 and up to 16,384 trunks 137 via eight stages of switching.

Although I depict in FIG. 1 a full size switching network 100, it is to be understood that less than a full size network may be provided in accordance with my invention, as described hereinbelow.

Figure 2:
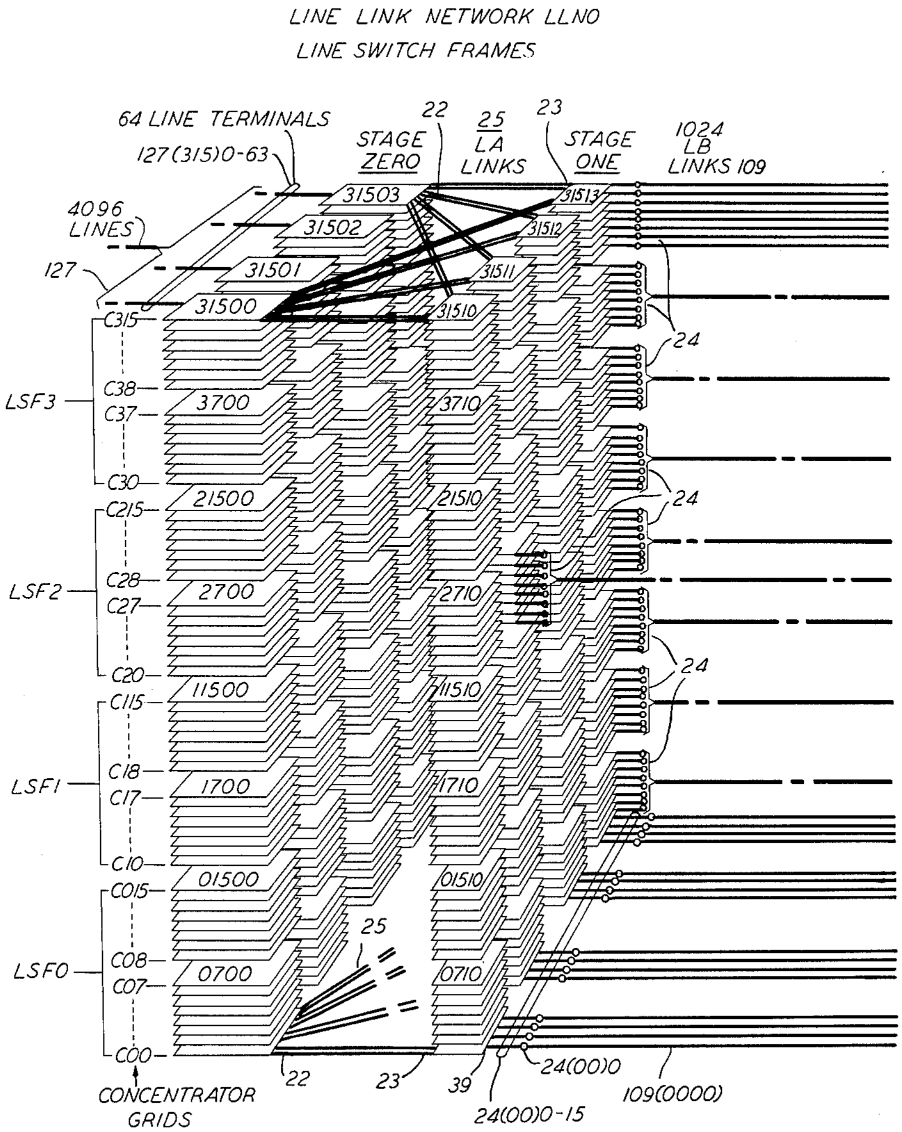
Figure 3:
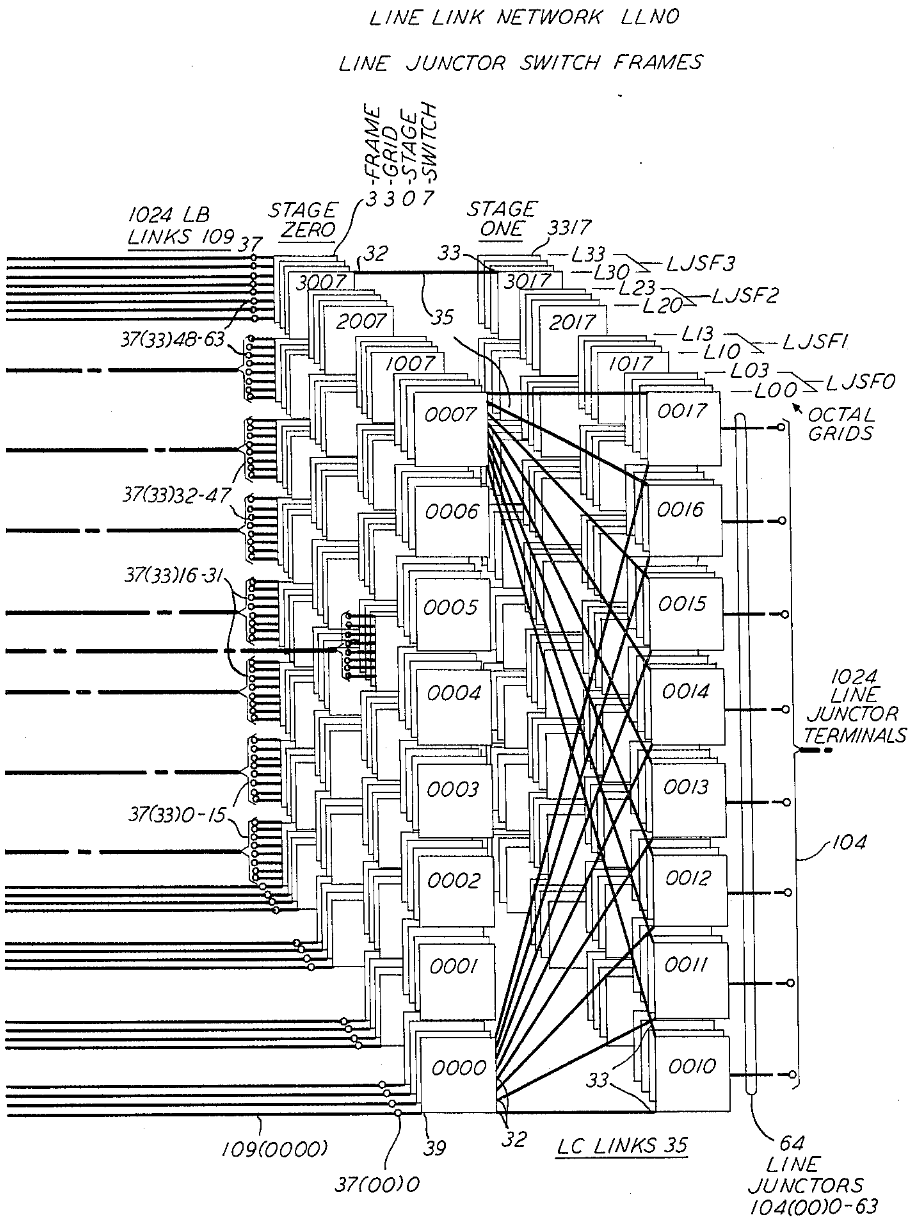
Figure 4:
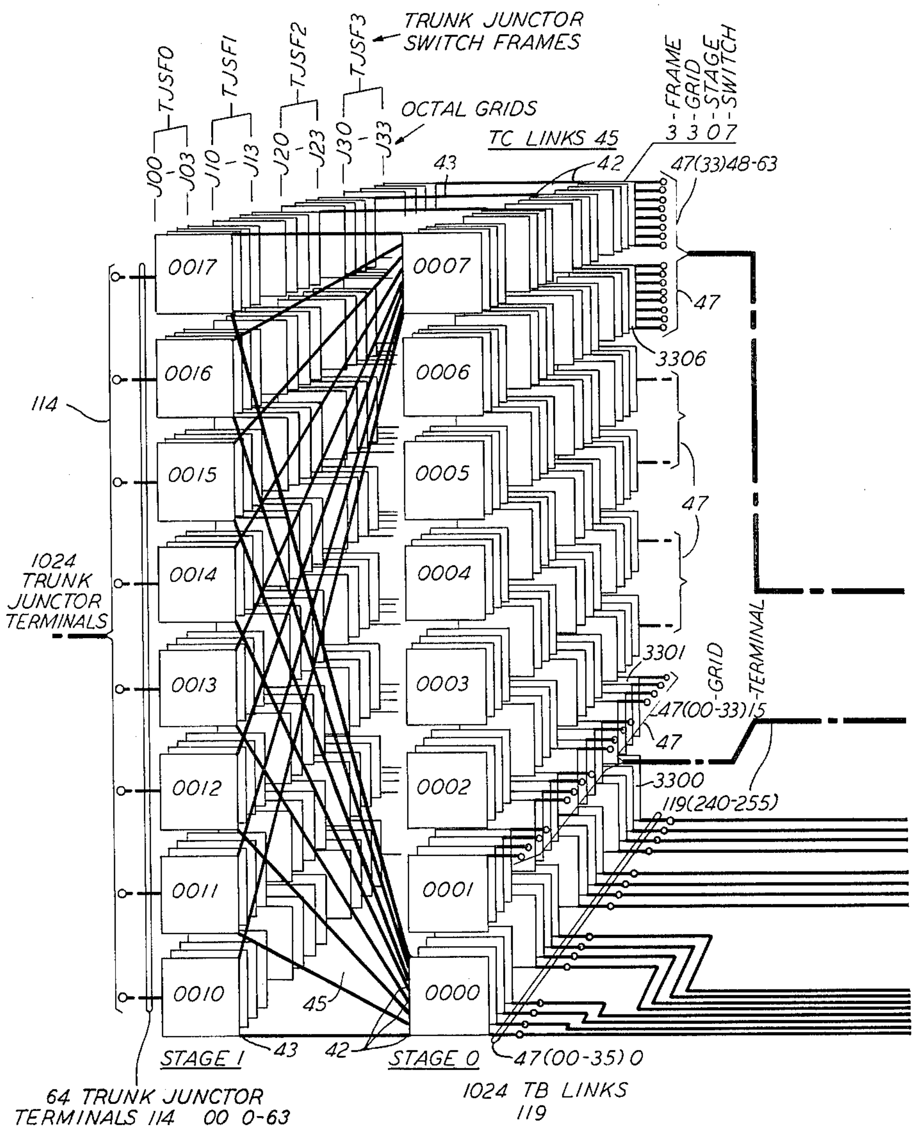
Figure 5:
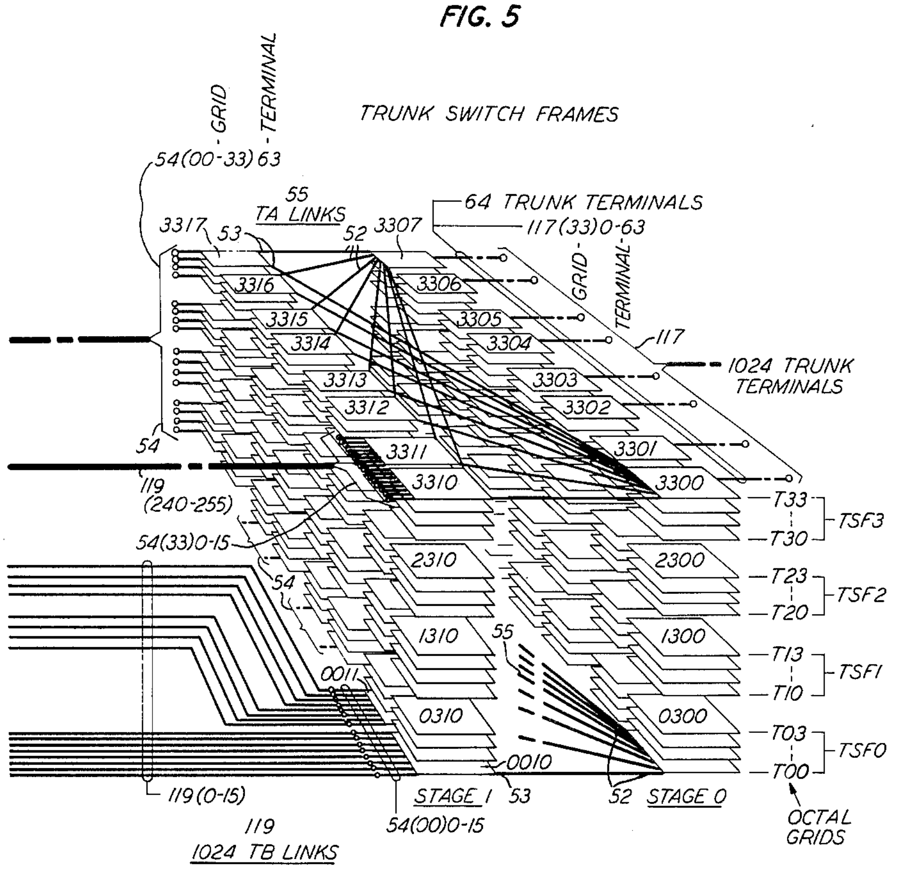

The illustrative eight stage switching network 100 comprises two basic types of four stage sub-networks which are respectively designated line link networks LLN0–LLN15 and trunk link networks TLN0–TLN15. Each line link network LLN0–LLN15, as described below with reference to FIGS. 2 and 3, provides for selectively connecting each of 4,096 line input terminals 127 to any of 1,024 line junctor terminal outputs 104 through four switching stages. Thus in the drawing each input terminal 127 represents 1,024 terminals and each line junctor terminal 104 represents 256 such terminals. Each trunk link network TLN0–TLN15, as described below with reference to FIGS. 4 and 5, provides for selectively connecting each of 1,024 trunk input terminals 117 to any of 1,024 trunk junctor terminal outputs 114 through four switching stages. Thus again in the drawing each input terminal 117 represents 256 such terminals and each junctor terminal 114 represents 256 such terminals. The number of line link networks LLN0–LLN15 and trunk link networks TLN0–TLN15 of which a switching network in accordance with my invention is comprised may be varied in accordance with the number of switching network terminations required. Although at least one line link network and at least one trunk link network must be provided, the number of line link networks and trunk link networks need not be equal.

As described further below with reference to FIGS. 2 and 3, each line link network LLN0–LLN15 comprises four line switch frames LSF0–LSF63 and four line junctor switch frames LJSF0–LJSF63. The four line switch frames LSF0–LSF63 and line junctor switch frames LJSF0–LJSF63 within each respective line link network LLN0–LLN15 are connected via LB links 109 in a full access pattern, as hereinafter further described, to allow any line input terminal 127 of a particular line link network LLN0–LLN15 to be selectively connected to any line junctor terminal output 104 of the same line link network LLN0–LLN15. Line link networks LLN0–LLN15 may be partially equipped with fewer than the full complement of four line switch frames and four line junctor switch frames if a full size line link network is not required.

As described further below with reference to FIGS. 4 and 5, each trunk link network TLN0–TLN15 comprises four trunk switch frames TSF0–TSF63 and four trunk junctor switch frames TJSF0–TJSF63. The trunk switch frames TSF0–TSF63 and trunk junctor switch frames TJSF0–TJSF63 within each respective trunk link network TLN0–TLN15 are connected via TB links 119 in a full access pattern, as hereinafter further described, to allow any trunk input terminal 117 of a particular trunk link network TLN0–TLN15 to be selectively connected to any trunk junctor terminal output 114 of the same trunk link network TLN0–TLN15. Trunk link networks may also be partially equipped if a full size trunk link network is not desired.

In accordance with an aspect of my invention, all line junctor terminals 104 and trunk junctor terminals 114 appear on a junctor grouping frame 180. The junctor grouping frame 180 allows for easy rearrangement of traffic patterns and specifically provides junctor cross connection facilities whereby any trunk junctor terminal 114 may be directly connected via junctor across connections 181 to any other trunk junctor terminal 114 to provide bidirectional, folded network paths through a trunk link network or networks TLN0–TLN15 for completing trunk to trunk calls; whereby any trunk junctor terminal 114 may be directly connected via junctor cross connections 186 to any line junctor terminal 104 to provide bidirectional, nonfolded network paths through a line link network LLN0–LLN15 and a trunk link network TLN0–TLN15 for completing line to trunk and trunk to line calls; and whereby any line junctor terminal 104 may be connected to any other line junctor terminal 104 via first junctor cross connections 184, line junctor circuits 150 and their respectively associated junctor links 151 and 152 and second junctor cross connections 185 to provide bidirectional, folded network paths through a line link network or networks LLN0–LLN15 for the completion of line to line calls. The pattern in which the above typical junctor cross connections 181, 184, 185 and 186 are made, and the selection of the particular line junctor terminals 104 and trunk junctor terminals 114 to be interconnected are determined in accordance with the estimated traffic requirements of the switching network 100. Rearrangement of junctor cross connections on the junctor grouping frame 180 to comply with future changes in traffic requirements, in networks incorporating this aspect of my invention, are easily accomplished at this central cross connection facility.

Junctor grouping frame 180 includes a cross-connection field in which semipermanent cross-connections are made between selected line junctor terminals 104, trunk junctor terminals 114 and junctor link terminals 151, 152, 153 and 158. Each representative junctor and junctor link terminal comprises a group of conductor terminals equal in number to the parallel transmission conductors of which a transmission path through the switching network 100 is comprised. Cross-connections, such as 181–186, are included in multiconductor cross-connecting cables equipped at both ends with receptacle units adapted to fit the respective junctor and junctor link terminals in plug-in fashion. Cross-connecting cables include facilities for interconnecting a plurality of conductor terminal groups since junctor terminals and junctor link terminals are generally interconnected in selected groups.

Line junctor circuits 150 are advantageously interconnecting relay circuits providing scanning points for supervision of the connected paths and relay contacts for making the final connection to establish the path, as is known in the art. As the type of circuit involved, as well as the types of scanning, supervision, and control, form no part of my invention, which is directed to aspects of the transmission path configurations of a large switching network, these aspects of this illustrative embodiment will not be further detailed.

It will be noted that each line link network LLN0–LLN15 exhibits a partially folded network configuration for the completion of line to line calls and a partially nonfolded network configuration for the completion of line to trunk calls. Each trunk link network TLN0–TLN15 exhibits a partially folded network configuration for the completion of trunk to trunk calls and a partially nonfolded network configuration for the completion of line to trunk calls. The folded or nonfolded configuration of the trunk link networks TLN0–TLN15 and the line link networks LLN0–LLN15 is determined by the pattern in which junctor cross connections 181–186 are made between line junctor terminals 104 and trunk junctor terminals 114 at the junctor grouping frame 180.

To provide for fully flexible interconnection of lines 107, it is advantageous to have at least one line junctor terminal 104 of each line junctor switch frame LJSF0–LJSF63 connected to at least one line junctor terminal 104 of itself and all other line junctor switch frames LJSF0–LJSF63. For example, one line junctor terminal of line junctor switch frame LJSF0 should be connected to at least one line junctor terminal 104 of itself LJSF0 and to at least one line junctor terminal 104 of all other line junctor switch frames LJSF1–LJSF63. In a relatively small switching network, i.e. one having fewer than eight line link networks containing a total of thirty-two line junctor switch frames, wherein a reasonable amount of line to line traffic is expected, the number of line junctor terminals 104 which must be interconnected will not so decrease the number of other line junctor terminals 104 which are available for connection to trunk junctor terminals 114 as to unduly reduce the facilities for line to trunk and trunk to line traffic. However, as the switching network grows in size and more line junctor switch frames are added, the number of line junctor terminals 104 of each line junctor switch frame which must be connected to other line junctor switch frames will increase proportionately. Therefore, the number of line junctor terminals 104 available from each line junctor switch frame for connection to trunk junctor terminals 114 is accordingly decreased. Further, as the switching network grows, the amount of line to trunk and trunk to line traffic will increase. As a result, fewer line junctor terminal 104 to trunk junctor terminal 114 junctor cross connections 186 are available than may be required to complete this traffic, and line to trunk calls may be blocked due to a lack of sub-network interconnecting facilities.

In accordance with an aspect of my invention, a third type of sub-network, which is designated a line junctor link network LJLN0, is provided in the illustrative switching network 100 to alleviate the above-described problem of line junctor terminal availability. Each of the line junctor circuits 150 has two junctor links 151 and 152 or 153 and 158 associated therewith. Those of junctor circuits 150 having junctor links 151 and 152 associated therewith are used, as previously described, for direct interconnection of line junctor terminals 104 via the junctor grouping frame 180. Those of line junctor circuits 150 having junctor links 153 and 158 associated therewith are used, as hereinafter described, for interconnection of line junctor terminals 104 via the junctor grouping frame 180 and the line junctor link network LJLN0 which is serially inserted in junctor links 158 to achieve greater flexibility of sub-network interconnection with a reduced number of line junctor terminals 104.

To illustrate the utility of a line junctor link network LJLN0 in accordance with my invention the following example is given. Assuming that a full size, 65,536 line switching network 100 is provided without line junctor link network LJLN0, sixty-four line junctor terminals 104 of each of the sixty-four line junctor switch frames LJSF0–LJSF63 are required to connect each line junctor switch frame LJSF0–LJSF63 to itself and to all other line junctor switch frames LJSF0–LJSF63 via line junctor circuits 150 and their associated junctor links 151 and 152. By my provision of a line junctor link network LJLN0, I reduce the number of line junctor terminals 104 from each of the sixty-four line junctor switch frames LJSF0–LJSF63 required to connect each line junctor switch frame LJSF0–LJSF63 to itself and to all other line junctor switch frames LJSF0–LJSF63 from sixty-four to eight line junctor terminals 104 per line junctor switch frame LJSF0–LJSF63.

Four line junctor terminals 104 of each line junctor switch frame LJSF0–LJSF63 are connected via junctor cross connections 182 to four of the junctor links 158 which are terminated as inputs 157 of line junctor link network LJLN0. Four other line junctor terminals 104 of each line junctor switch frame LJSF0–LJSF63 are connected via junctor cross connections 183 to four junctor links 153. The output terminals 154 of line junctor link network LJLN0 are connected to those of line junctor circuits 150 which have junctor links 153 associated therewith.

As described further below with reference to FIG. 6, a line junctor link network 600 provides selectable, bidirectional, connecting facilities between each of two hundred fifty-six junctor link input terminals 157 and any of two hundred fifty-six junctor link output terminals 154 through two switching stages. Line junctor link network LJLN0 provides four, selectable, connecting paths between each line junctor switch frame LJSF0–LJSF63 over which the respective lines 107 may be interconnected. Without line junctor link network LJLN0, only one selectable path was provided between each of the line junctor switch frames LJSF0–LJSF63. Line junctor link network LJLN0 has provided sufficient added switching flexibility to introduce universality to the line junctor terminals of each line link network LLN0–LLN15, which would otherwise be respectively limited in access to a single specific one of line junctor link frames LJSF0–LJSF63 within a single specific line link network LLN0–LLN15.

Although not shown in FIG. 1, a trunk junctor link network may be provided to increase the flexibility of interconnection between trunk junctor switch frames TJSF0–TJSF63 in a manner similar to the illustrated provision of line junctor link network LJLN0.

A suggested arrangement of control and supervisory circuitry 170 with which the illustrative switching network 100 may advantageously be blended is shown in FIG. 1. Central processing and pulse distribution circuit 171 determines and generates commands which are transmitted on an asynchronous time division basis via a peripheral bus system 175 to a network control circuit 172, supervisory control circuit 173 and supervisory scanning circuit 174.

The various commands which are transmitted to network control 172 are executed thereby in the appropriate line link network LLN0–LLN15, trunk link network TLN0–TLN15 or line junctor link network LJLN0. The various commands transmitted to supervisory scanning 174 initiate the scanning of line terminals 127 and trunk circuits 147 to detect new service requests therefrom, and the scanning of junctor circuits 150 and trunk circuits 147 to ascertain which of the existing connections through the switching network 100 may be released. Other scanning functions may be similarly performed by supervisory scanning 174 responsive to commands transmitted thereto. The commands transmitted to supervisory control 173 initiate appropriate execution thereby in the trunk circuits 147 and the junctor circuits 150. These initiate, among other functions, the final "cut-through" of a call connection through the switching network 100 and the initial "opening" of an established connection through the switching network 100.

*Basic switching grid units (FIGS. 7 and 8)*

Figure 7:
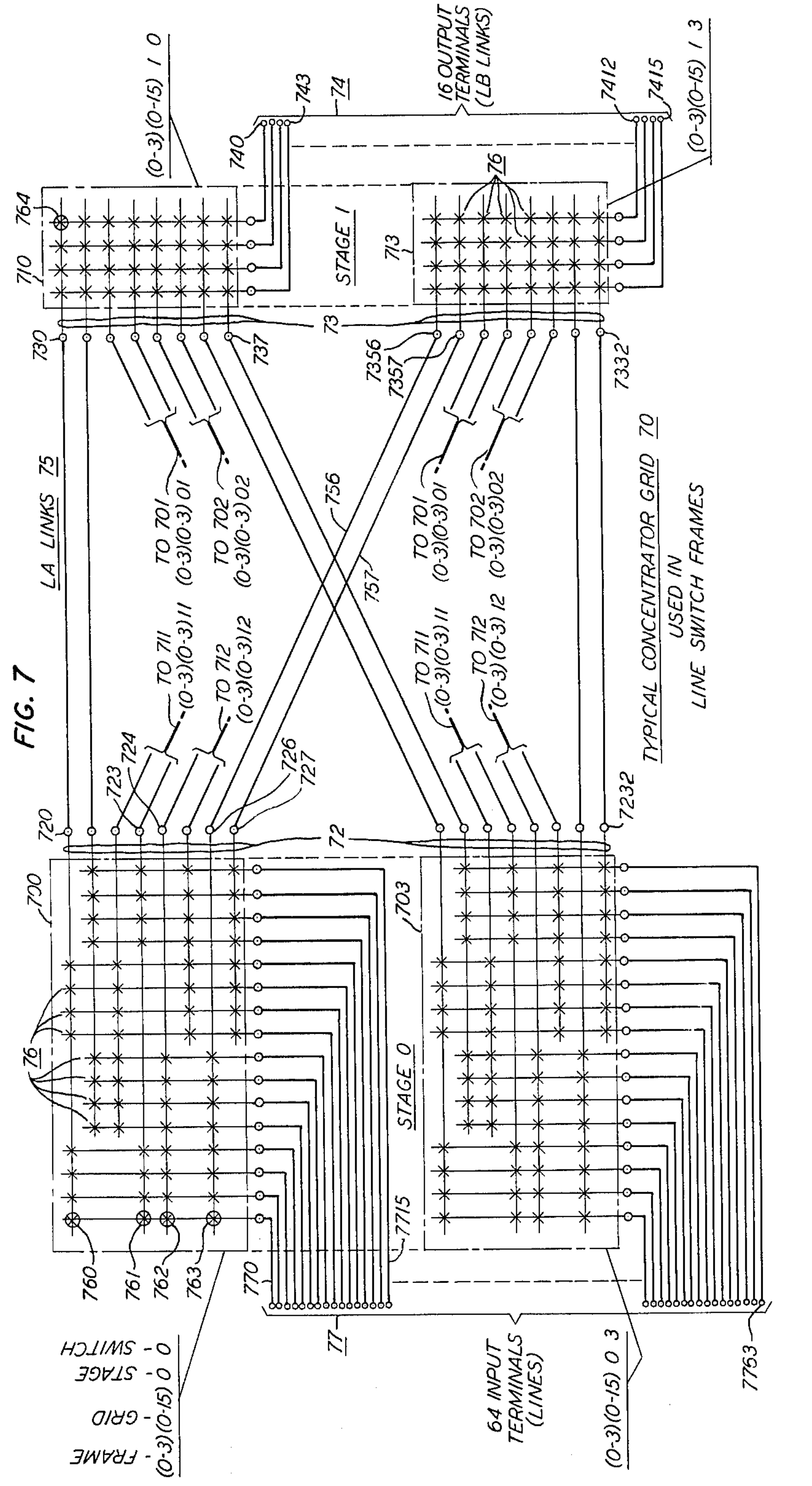
FIG. 7 is a schematic representation of a typical concentrator grid.
Figure 8:
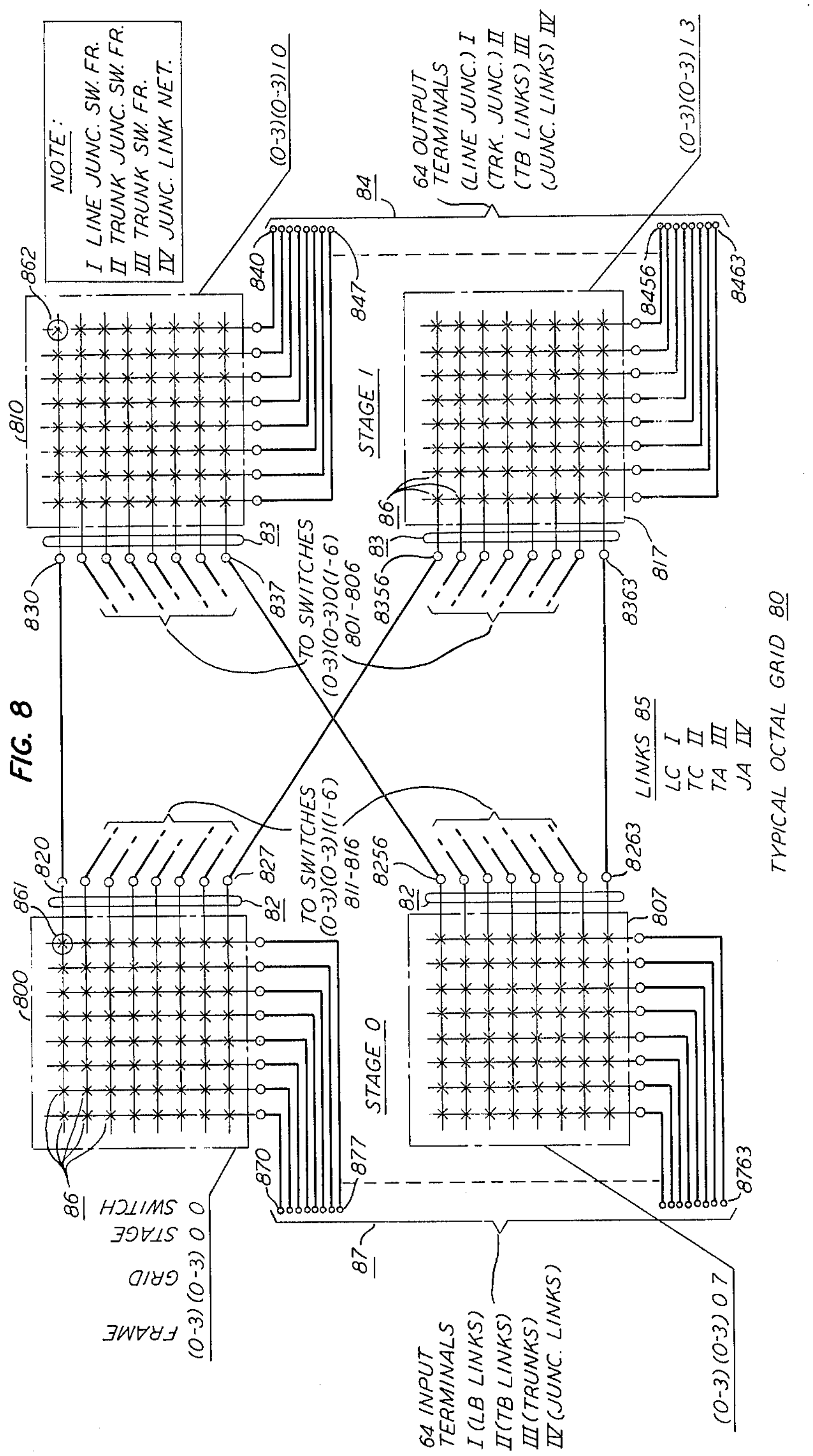
FIG. 8 is a schematic representation of a typical octal grid.

FIGS. 7 and 8 illustrate the organization of the transmission path connecting contacts, 76 and 86 respectively, into a plurality of coordinate switch arrays 700–703, 710–713 and 800–807, 810–817 to form the basic switching grid units 70 and 80 utilized in the sub-networks of the embodiment of FIG. 1. Only the switching device contacts are shown, since the means whereby the contacts are controlled forms no part of this invention. It is assumed that the switching device contacts, for example contacts 86 of FIG. 8, may be selectively closed and opened responsive to control thereof by their respectively associated switching devices. For purposes of simplicity, a single connecting path through the switching grid units shown in FIGS. 7 and 8 is representative of a transmission path comprising any number of parallel conductors.

The numerical designations of the various components of the grid units 70 and 80, shown in FIGS. 7 and 8, do not have any functional meaning. However, the last digit of the respective numerical designations will be used whenever possible to designate similar components of similar grid units in the remainder of the other figures of the drawing. For example, the output terminals of the octal grid 80 shown in FIG. 8 are designated 84. The output terminals of all octal grids shown in FIGS. 3, 4 and 5 are designated 104, 114 and 54, respectively. It will be noted that the last digit of each of the above designations assigned to the output terminals of an octal grid is the digit 4. This system of numbering is used to facilitate cross referencing to FIGS. 7 and 8 from the other figures.

FIG. 8 illustrates the organization of an "octal grid" 80. The switching device contacts 86 are arranged in a plurality of coordinate switch arrays 800–807 and 810–817, of which only the first arrays 800 and 810 and last arrays 807 and 817 are shown. Each coordinate switch array, for example array 800, has eight input terminals 870–877 in one coordinate thereof and eight output terminals 820–827 in the other coordinate thereof. Each of the eight input terminals 870–877 is connectable through a selectively closed contact 86 to any of the eight output terminals 820–927 of the same switch array 800. For example, input terminal 877 may be connected to output terminal 820 by closing contact 861. This type of switch array is designated an "8 x 8" switch.

An octal grid 80 comprises sixteen 8 x 8 switches 800–807 and 810–817 which are arranged in two switching stages 0 and 1, each having eight 8 x 8 switches. The output terminals 82 of each first stage switch 800–807 are connected via links 85 to one input terminal 83 of each second stage switch 810–817. This full access type pattern of link distribution permits the selective connection of each of the sixty-four input terminals 87 of an octal grid 80 to any of the sixty-four output terminals 84 of the same octal grid 80. For example, input terminal 877 may be connected to output terminal 840 by closing contacts 861 and 862.

It will be noted that, in addition to the numerical designations 800–807 and 810–817, each 8 x 8 switch is further designated with a four digit number to indicate its position within the octal grid 80. This four digit number also indicates the number of the particular switch frame and the number of the particular octal grid in which the switch is used. For example, switch 800 is also designated switch (0–3)(0–3)00. The first digit (0–3) of this designation indicates the number of the switch frame, i.e. 0, 1, 2 or 3. The second digit (0–3) of this designation indicates the number of the octal grid, i.e. 0, 1, 2 or 3, within that switch frame. The third digit 0 of this designation indicates the switching stage, i.e. 0 or 1, within the octal grid. The last digit 0 of the designation indicates the number of the particular switch, i.e. 0, 1, 2, 3, 4, 5, 6 or 7. To illustrate, a four digit switch designation 3210 would indicate switch 0, of switching stage 1, of octal grid 2, of switch frame 3. The use of this four digit switch designation will be more apparent when FIGS. 2–6 are described herein below.

The octal grid 80 is a basic switching unit which is utilized in various portions of my illustrative switching network. The particular portions in which it is used are indicated in the note on FIG. 8. These areas of use are cross referenced from the note on FIG. 8 by Roman numerals I, II, III and IV to the various input terminal 87, output terminal 84 and link 85 designations which are applicable to these components of the octal grid 80 when it is used in the respectively indicated areas of the switching network of FIG. 1 described above. Reference to these designations will be made hereinafter.

FIG. 7 illustrates the organization of a "concentrator grid" 70. A concentrator grid 70 comprises four, first stage, partial access, concentrating switch arrays 700–703, and four, second stage, full access, concentrating switch arrays 710–713. Each first stage array, for example array 700, has sixteen input terminals 770–7715 in the vertical coordinate thereof and eight input terminals 720–727 in the horizontal coordinate thereof. The switching device contacts 76 are so arranged that each of the sixteen input terminals 770–7715 is selectively connectable to only four of the eight output terminals 720–727. For example, input terminal 770 of switch 700 may be connected to output terminals 720, 723, 724 or 726 by selectively closing contacts 760, 761, 762 or 763, respectively. This type of array is designated as a "16 x 4/8 switch."

Each second stage array, for example array 710, has eight input terminals 730–737 in the horizontal coordinate thereof and four output terminals 740–743 in the vertical coordinate thereof. Each input terminal 730–737 is selectively connectable to any output terminal 740–743 of array 710. For example, input terminal 730 may be connected to output terminal 740 by closing contact 764. This type of array is designated as an "8 x 4 switch."

The eight output terminals 72 of each first stage switch 700–703 of a concentrator grid 70 are connected in consecutive pairs via LA links 75 to two input terminals 73 of each second stage switch 710–713. For example, output terminals 726 and 727 of switch 700 are connected via LA links 756 and 757 to input terminals 7356 and 7357 of switch 713. This provides a full access pattern of LA link distribution which permits the selective connection of each of the sixty-four input terminals 77 of a concentrator grid 70 to any of the sixteen output terminals 74 thereof. For example, input terminal 770 may be connected to output terminal 740 by closing contacts 760 and 764.

It will be noted in FIG. 7 that switch designations indicating the position of a particular switch within the switching network are shown which are similar to the four digit switch designations shown on FIG. 8. As previously described with reference to FIG. 8, the first digit of these designations indicates a switch frame number, 0, 1, 2 or 3; the second digit or digit pair indicates a concentrator grid number, 0, 1, 2, 3, 4, 5, 6, 7, 8, 9, 10, 11, 12, 13, 14 or 15; the third digit indicates a switching stage number 0 or 1; and the last digit indicates a switch number 0, 1, 2 or 3.

The concentrator grid 70 provides a four-to-one concentration ratio between the sixty-four input terminals 77 thereof and the sixteen output terminals 74 thereof. This ratio may be varied by appropriate changes in the contact arrangement of the respective switch arrays 700–703 and 710–713. In the embodiment of my invention depicted in FIG. 1, concentrator grids are used only in the line switch frames of the switching network, as described hereinbelow.

Although the octal grid 80 and the concentrator grid 70, as described above, are the basic switching units of the illustrative switching network described herein, numerous other uints having varying configurations are equally compatible for use in a switching network organized in accordance with this invention.

*Line Link network (FIGS. 2 and 3)*

FIGS. 2 and 3 depict, in the form of a perspective breakdown, an illustrative organization of concentrator grids CO0–C315 and octal grids LO0–L33 into one illustrative type of sub-network, which is depicted in the line link network LLN0 of FIG. 1. As discussed above with reference to FIG. 1, line link network LLN0 provides selectable, bidirectional connecting facilities between each of 4,096 line input terminals 127 thereof and any of 1,024 line junctor output terminals 104 thereof.

Line link network LLN0 includes four line switch frames LSF0–LSF3, each of which comprises sixteen concentrator grids CO0–C315, for example, concentrator grids CO0–CO15 of line switch frame LSF0. Thus, a total of sixty-four concentrator grids CO0–C315 are included in a full size line link network 200. Sixty-four lines are terminated as inputs 127 of each concentrator grid CO0–C315. Sixteen "LB" links 109 are terminated as outputs 24 of each concentrator grid CO0–C315. Each concentrator grid CO0–C315 provides selectable, bidirectional, connecting facilities between each of the sixty-four line input terminals 127 thereof and any of the sixteen LB link output terminals 24 thereof.

The sixty-four concentrator grids CO0–C315 of the four line switch frames LSF0–LSF3 shown in FIG. 2 are respectively represented by sixty-four horizontal planes arranged in a vertical stack. Each horizontal plane within the stack represents four 16 x 4/8 first stage switches, for example switches 31500–31503 of concentrator grid 316; four 8 x 4 second stage switches, for example switches 31510–31513 of concentrator grid 315; and the LA links 25 which connect the output terminals 22 of the first stage switches 31500–31503 to the input terminals 23 of the second stage switches 31510–31513.

Each switch within each concentrator grid CO0–C315 is assigned a multi-digit designation which indicates its position within the four line switch frames LSF0–LSF3 of line link network LLN0. For example, switch 31501 is the second switch 1, of the first switching stage 0, of the sixteenth concentrator grid 15, of the fourth line switch frame LSF3, of the line link network LLN0. This system of numbering was previously described with reference to FIG. 7.

The LA link distribution pattern, as previously described with reference to FIG. 7, is representatively shown in the uppermost horizontal plane of the stack. This plane represents concentrator grid C315, which is the sixteenth concentrator grid, of the third line switch frame LSF3, of the line link network LLN0. This LA link distribution pattern is duplicated, although not shown, in all other concentrator grids CO0–C314 of the line link network LLN0, as represented by the other horizotnal planes in the stack.

For purposes of clarity, only representative line input terminals 127(315)0–63 and LB link output terminals 24(00)0–15 of the respective concentrator grids C315 and CO0 have been indicated in FIG. 2. Sixty-four line input terminals 127(315)0–63 are indicated for the uppermost plane of the stack, which represents concentrator grid C315. Each of the other concentrator grids CO0–C314 of the line link network 200 similarly have sixty-four line input terminals 127. Sixteen LB link output terminals 24(00)0–15 are indicated for the lowermost plane of the stack, which represents concentrator grid CO0. Each of the other concentrator grids CO1–C315 of the line link network 200 similarly have sixteen LB link output terminals 24.

Line link network LLN0 further includes four line junctor switch frames LJSF0–LJFS3, each of which comprises four octal grids LO0–L33, for example octal grids LO0–LO3 of line junctor switch frame LJSF0. Thus, a total of sixteen octal grids LO0–L33 are included in a full size line link network 200. Sixty-four LB links 109 are terminated as inputs 37 of each octal grid LO0–L33. Sixty-four line junctor terminals comprise the outputs 104 of each octal grid LO0–L33. Each octal grid LO0–L33 of the line link network LLN0 provides selectable bidirectional, connecting facilities between each of the sixty-four LB link input terminals 37 thereof and any of the sixty-four line junctor output terminals 104 thereof.

The sixteen octal grids LO0–L33 of the four line junctor switch frames LJSF0–LJSF3 shown in FIG. 3 are respectively represented by sixteen vertical planes arranged in a horizontal stack. Each vertical plane within the stack represents eight 8 x 8 first stage switches, for example switches 0000–0007 of octal grid LO0; eight 8 x 8 second stage switches, for example switches 0010–0017 of octal grid LO0; and the LC links 35 which connect the output terminals 32 of the first stage switches 0000–0007 to the input terminals 33 of the second stage switches 0010–0017.

The switches included in octal grids LO0–L33 of FIG. 3 are numbered with four digit designations, the meaning of which was previously described with reference to FIG. 8.

The LC link distribution pattern, as previously described with reference to FIG. 8, is partially exemplified in the foremost vertical plane of the stack. This plane represents octal grid LO0, which is the first octal grid, of the first line junctor switch frame LJSF0, of the line link network 200. This LC link distribution pattern is duplicated, although not shown, in all other octal grids LO1–L33 of the line link network LLN0, as represented by the other vertical planes in the stack.

For purposes of clarity, only representative LB link input terminals 37(33)0–63 and line junctor output terminals 104(00)0–63 of the respective octal grids L33 and LO0 have been indicated in FIG. 3. Sixty-four LB link input terminals 37(33)0–63 are indicated for the rearmost vertical plane, which represents octal grid L33. Each of the other octal grids LO0–L32 of the line link network LLN0 similarly have sixty-four LB link input terminals 37. Sixty-four line junctor terminal outputs 104(00)0–63 are indicated for the foremost vertical plane, which represents octal grid LO0. Each of the other octal grids LO1–L33 of the line link network LLN0 similarly have sixty-four line junctor terminal outputs 104.

The illustrative LB link distribution pattern, shown in FIGS. 2 and 3, is so arranged that each of the sixteen output terminals 24 of each concentrator grid CO0–C315 is connected via an LB link 109 to an input terminal 37 of each of the sixteen octal grids LO0–L33. Although, for purposes of clarity, the illustrative LB link distribution pattern is only partially indicated, the full pattern may be completed by extending the sixty-four respective horizontal planes representing the concentrator grids CO0–C315 in FIG. 2 to intersect the sixteen respective vertical planes representing the octal grids LO0–L33 in FIG. 3. Each point at which a vertical plane intersects a horizontal plane indicates the location of an LB link connection 109 between the concentrator grid and the octal grid respectively represented by the two intersecting planes. For example, the horizontal plane representing concentrator grid CO0 will, when extended, intersect the vertical plane representing octal grid LO0 at a point 39, which corresponds to the first output terminal 24(00)0 of concentrator grid CO0 and the first input terminal 37(00)0 of octal grid LO0. This indicates that an LB link connection 109(0000) is made between the first output terminal 24(00)0 of concentrator grid CO0 and the first input terminal 37(00)0 of octal grid LO0. This particular illustrative LB link distribution pattern provides a single, selectable, bidirectional, connecting path between each of the 4,096 line input terminals 127 of the various concentrator grids CO0–C315 of a line link network 200 and each of the 1,024 line junctor terminal outputs 104 of the various octal grids LO0–L33 thereof.

The above-described LB link distribution pattern provides a four-to-one concentration ratio between the line input terminals 127 and the line junctor terminal outputs 104 of the line link network LLN0. Variations of this distribution pattern may be made to achieve other concentration ratios if desired.

Although a full size typical line link network LLN0 is shown in FIGS. 2 and 3, a line link network may be partially equipped with fewer than the full complement of four line switch frames and four line junctor switch frames. Line switch frames and line junctor switch frames need not be provided in equal number.

The horizontal planes, which represent the concentrator grids CO0–C315 in FIG. 2, are arranged in groups of eight, with each line switch frame LSF0–LSF3 including two such groups. For example, line switch frame LSF0 includes a first group of eight concentrator grids CO0–CO7 and a second group of eight concentrator grids CO8–CO15. Line switch frames may be partially equipped with a single group of eight concentrator grids, if desired.

The ability to partially equip a line link network and to further partially equip a line switch frame within a line link network permits the initial provision of only as many line link network terminations as may then be required. As growth in required network terminations occurs, additional line link network equipment may be added until a full size line link network is provided. As further described above with reference to FIG. 1, a plurality of line link networks may be advantageously combined within a single switching sub-network in accordance with embodiments of my invention.

*Trunk link network*

FIGS. 4 and 5 depict, in the form of a perspective breakdown, an illustrative organization of octal grids TO0–T33 and JO0–J33 into another type of sub-network, which is illustrated by trunk link network TLN0. A full size trunk link network TLN0 provides selectable, bidirectional, connecting facilities between each of 1,024 trunk input terminals 117 thereof and any of 1,024 trunk junctor terminal outputs 114 thereof, as described above with reference to FIG. 1.

The full size trunk link network TLN0 includes four trunk switch frames TSF0–TSF3 each of which comprises four octal grids, for example octal grids T30–T33 of trunk switch frame TSF3; and four trunk junctor switch frames TJSF0–TJSF3 each of which comprises four octal grids, for example octal grids JO0–JO3 of trunk junctor switch frame TJSF0. Thus, a total of thirty-two octal grids TO0–T33 and JO0–J33 are included in trunk link network TLN0.

Sixty-four trunks are terminated as inputs 117 of each octal grid TO0–T33 of each trunk switch frame TSF0–TSF3. Sixty-four TB links 119 are terminated as outputs 54 of each octal grid TO0–T33 of each trunk switch frame TSF0–TSF3. Each octal grid TO0–T33 of each trunk switch frame TSF0–TSF3 provides selectable, bidirectional, connecting facilities between each of the sixty-four trunk input terminals 117 thereof and any of the sixty-four TB link output terminals 54 thereof.

Sixty-four TB links 119 are terminated as inputs 47 of each octal grid JO0–J33 of each trunk junctor switch frame TJSF0–TJSF3. Sixty-four trunk junctor terminals compirse the outputs 114 of each octal grid JO0–J33 of each trunk junctor switch frame TJSF0–TJSF3. Each octal grid JO0–J33 of each trunk junctor switch frame TJSF0–TJSF3 provides selectable, bidirectional, connecting facilities between each of the sixty-four TB link input terminals 47 thereof and any of the sixty-four trunk junctor terminal outputs 114 thereof.

The sixteen octal grids TO0–T33 of the four trunk switch frames TSF0–TSF3 shown in FIG. 5 are respectively represented by sixteen horizontal planes arranged in a vertical stack. Each horizontal plane within the stack represents eight 8 x 8 first stage switches, for example switch 3300–3307 of octal grid T33; eight 8 x 8 second stage switches, for example switches 3310–3317 of octal grid T33; and the TA links 55 which connect the output terminals 52 of the first stage switches 3300–3307 to the input terminals 53 of the second stage switches 3310–3317. The TA link distribution pattern, as previously described with reference to FIG. 8, is partially exemplified in the uppermost horizontal plane of the stack. This plane represents octal grid T33, which is the fourth octal grid, of the four trunk switch frame TSF3, of trunk link network TLN0. This TA link distribution pattern is duplicated, although not shown, in all other octal grids TO0–T32 of the four trunk switch frames TSF0–TSF3 of trunk link network TLN0, as represented by the other horizontal planes in the stack.

Each 8 x 8 switch of the four trunk switch frames TSF0–TSF3 is designated with a four digit numerical designation which indicates the position of the switch within the trunk switch frames TSF0–TSF3. This system of numbering and the interpretation of the four digit numerical designations was previously described with reference to FIGS. 3 and 8.

For purposes of clarity, only representative trunk input terminals 117(33)0–63 and TB link output terminals 54 of the respective octal grids T33 and TO0 have been indicated in FIG. 5. Sixty-four trunk input terminals 117(33)0–63 are indicated for the uppermost horizontal plane which represents octal grid T33. Each of the other octal grids TO0–T32 of the four trunk switch frames TSF0–TSF3 similarly have sixty-four trunk input terminals 117. Representative TB link output terminals 54 are shown for the lowermost horizontal plane, which represents octal grid TO0. Each of the other octal grids TO1–T33 similarly have sixty-four TB link output terminals 54.

The sixteen octal grids JO0–J33 of the four trunk junctor switch frames TJSF0–TJSF3 shown in FIG. 4 are respectively represented by sixteen vertical planes arranged in a horizontal stack. Each vertical plane within the stack represents eight 8 x 8 first stage switches, for example switches 0000–0007 of octal grid JO0; eight 8 x 8 second stage switches, for example switches 0010–0017 of octal grid JO0; and the TC links 45 which connect the output terminals 42 of the first stage switches 0000–0007 to the input terminals 43 of the second stage switches 0010–0017. The TC link distribution pattern, as previously described with reference to FIG. 8, is partially exemplified in the foremost vertical plane of the stack. This plane represents octal grid JO0, which is the first octal grid, of the first trunk junctor switch frame TJSF0, of trunk link network TLN0. This TC link distribution pattern is duplicated, although not shown, in all other octal grids JO1–J33 of the four trunk junctor switch frames TJSF0–TJSF3 in trunk link network TLN0, as represented by the other vertical planes in the stack.

The numbering system used to designate the particular switches of the four trunk junctor switch frames TJSF0–TJSF3 is similar to the previously described four digit numbering system used to designate the respective switches of the trunk switch frames TSF0–TSF3 (FIG. 5) and line junctor switch frames LJSF0–LJSF3 (FIG. 3).

For purposes of clarity, only representative TB link input terminals 47 and trunk junctor terminal outputs 114 of the respective octal grids JO0–J33 have been indicated in FIG. 4. Representative TB link input terminals 47 are shown to indicate the sixty-four TB link input terminals 47 of each octal grid JO0–J33 of the four trunk junctor switch frames TJSF0–TJSF3. Sixty-four trunk junctor terminal outputs 114(00)0–63 are shown for the foremost vertical plane which represents octal grid JO0. Each of the other octal grids JO1–J33 similarly have sixty-four trunk junctor terminal outputs 114.

The illustrative TB link distribution pattern shown in FIGS. 4 and 5 is so arranged that four of the sixty-four output terminals 54 of each octal grid TO0–T33 of each trunk switch frame TSF0–TSF3 are connected via a TB link 119 to four of the sixty-four input terminals 47 of each octal grid JO0–J33 of each trunk junctor switch frame TJSF0–TJSF3. Although the illustrative TB link distribution pattern is only partially indicated, the pattern may be understood from the following description thereof with reference to FIGS. 4 and 5.

As previously described with reference to FIG. 8, each 8 x 8 switch of an octal grid has eight output terminals. Accordingly, each pair of 8 x 8 switches has a total of sixteen output terminals. The four trunk junctor switch frames TJSF0–TJSF3 of trunk link network TLN0 comprise sixteen octal grids JO0–J33. In the illustrative TB link distribution pattern of FIGS. 4 and 5, each of the sixteen output terminals 54 of each of the four pairs of second stage 8 x 8 switches of the four trunk switch frames TSF0–TSF3 are respectively connected to one of the input terminals 47 of each of the sixteen octal grids JO0–J33 of the four trunk junctor switch frames TJSF0–TJSF3. For example, the sixteen output terminals 54(00)0–15 of the lowest numbered pair of second stage 8 x 8 switches 0010 and 0011 of octal grid TO0 are respectively connected via TB links 119(0–15) to the first output terminal 47(00–33)0 of the lowest numbered pair of first stage switches 0000–3300 and 0001–3301 of each of the sixteen octal grids JO0–J33 of the four trunk junctor switch frames TJSF0–TJSF3. The sixteen output terminals 54(33)0–15 of the lowest numbered pair of second stage switches 3310 and 3311 of octal grid T33 of trunk switch frame TSF3 are respectively connected via TB links 59(240–255) to the last input terminals 47(00–33)15 of the lowest numbered pair of first stage switches 0000–3300 and 0001–3301 of each of the sixteen octal grids JO0–J33 of the four trunk junctor switch frames TJSF0 and TJSF3. This distribution pattern is repeated between the sixteen output terminals 54(01–32)0–15 (not shown) of the lowest numbered pair of second stage switches 0110–3210 and 0111–3211 of octal grids TO1–T32 and the intermediate, corresponding input terminals 47(00–33)1–14 (not shown) of the lowest numbered pair of first stage switches 0100–3200 and 0101–3201 of each of the sixteen octal grids JO0–J33. An identical pattern of connection is shown between the last output terminals 54(00–33)63 of the highest numbered pair of second stage switches 0017–3317 and 0016–3316 of each octal grid TO0–T33 and the sixteen input terminals 47(33)48–63 of the highest numbered pair of first stage switches 3307 and 3306 of octal grid J33. The identical pattern is used to connect the output terminals 54 of the intermediate pairs of second stage switches 0012–3312 and 0013–3313; 0014–3314 and 0015–3315 of all octal grids TO0–T33 of the four trunk switch frames TSF0–TSF3 to the input terminals 47 of the corresponding intermedate pairs of first stage switches 0005–3305 and 0004–3304; 0003–3303 and 0002–3302 of all octal grids JO0–J33 of the four trunk junctor switch frames TJSF0–TJSF3.

In the above-described illustrative pattern of TB link distribution, a one-to-one relationship exists between the trunk input terminals 117 and the trunk junctor terminal outputs 114 of the trunk link network TLN0. This ratio may be varied by selective rearrangement of the TB link distribution pattern. Since each octal grid TO0–T33 of each trunk switch frame TSF0–TSF3 is connected via four TB links 119 to each octal grid JO0–J33 of each trunk junctor switch frame TJSF0–TJSF3, four, selectable, bidirectional, connecting paths are provided between each trunk input terminal 117 and each trunk junctor terminal output 114 of trunk link network TLN0. The number of available paths between input and output terminals 117 and 114 of trunk link network TLN0 may also be varied by TB link rearrangement.

Although a full size trunk link network TLN0 is shown in FIGS. 4 and 5, a trunk link network may be partially equipped with fewer than the full complement of four trunk switch frames and four trunk junctor switch frames in embodiments of my invention. Trunk switch frames and trunk junctor switch frames need not be provided in equal number. This ability to partially equip a trunk link network permits the initial provision of only the number of trunk link network terminations as may then be required. As growth in required trunk link network terminations is experienced, additional trunk and trunk junctor switch frames may be added until a full size trunk link network is provided. As above described with reference to FIG. 1, a plurality of trunk link networks may be combined within a single switching sub-network in accordance with embodiments of my invention.

*Line junctor link network (FIG. 6)*

Figure 6:
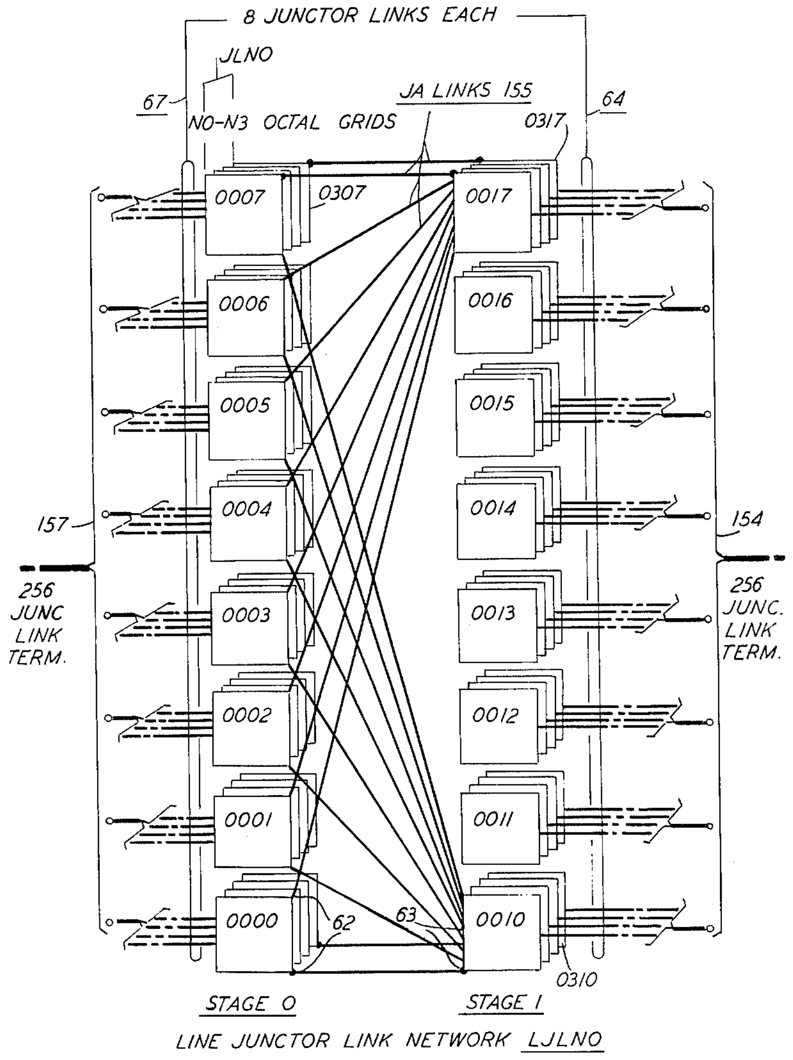
FIG. 6 is a perspective type diagram illustrating the organization of a typical line junctor link network.

FIG. 6 depicts, in the form of a perspective breakdown, an illustrative organization of octal grids N0–N3 into a further type of sub-network in accordance with my invention, namely line junctor link network LJLN0. Line junctor link network LJLN0 provides selectable, bidirectional, connecting facilities between each of 256 junctor link input terminals 157 and 256 junctor link output terminals 154.

The line junctor link network LJLN0 includes one junctor link switch frame JLN0, which comprises four octal grids N0–N3. Sixty-four junctor links 157 are terminated as inputs 67 of each octal grid N0–N3, and sixty-four junctor links 154 are terminated as outputs 64 of each octal grid N0–N3.

A comparison of FIG. 6 with FIG. 5 will indicate that the organization of junctor link frame JLN0 is identical to that of a single trunk switch frame TSF0. It therefore is felt unnecessary to further describe junctor link frame JLN0.

The utility of a line junctor link network LJLN0 in accordance with my invention has been set forth above with reference to FIG. 1.

The specific illustrative switching grid units and the organization thereof into sub-networks, as described hereinabove, may be varied in configuration and organization without departing from the scope of this invention. Numerous other switching devices may be arranged in varying network patterns by those skilled in the art without departing from the inventive concepts disclosed herein.

What is claimed is:

1. A communications switching network having a first switching portion comprising a first, partially folded, multistage, sub-network having an initial bidirectional switching stage upon which a first group of input terminals appear and a last bidirectional switching stage; a second switching portion comprising a second, partially folded, multistage, sub-network having an initial bidirectional switching stage upon which a second group of input terminals appear and a last bidirectional switching stage; bidirectional connecting means for connecting said first and second switching portions; said first switching portion controllable independent of said second switching portion to interconnect selectively said first group of input terminals; said second switching portion controllable independent of said first switching portion to interconnect selectively said second group of input terminals; and said first and second switching portions further controllable in combination to interconnect selectively said first and second input terminals by way of said connecting means.

2. A communications switching network in accordance with claim 1 wherein only said initial stages have input terminals thereon and said connecting means connect said last bidirectional switching stage of said first said sub-network to said last bidirectional switching stage of said second sub-network.

3. A communications switching network in accordance with claim 1 wherein said first input terminals have subscriber lines terminated thereon and certain of said second input terminals have bidirectional interoffice trunks terminated thereon.

4. A communications switching network comprising a first switching portion having an initial bidirectional switching stage with first input terminals appearing thereon, a last bidirectional switching stage with first junctor terminals terminated thereon and controllable switching means for selectively connecting said first input terminals and said first junctor terminals; a second switching portion having an initial bidirectional switching stage with second input terminals terminated thereon, a last bidirectional switching stage with second junctor terminals terminated thereon and controllable switching means for selectively connecting said second input terminals and said second junctor terminals; first connecting means for connecting a first group of said first junctor terminals to a first group of said second junctor terminals; second connecting means for connecting a second group of said second junctor terminals to a third group of said second junctor terminals; and third connecting means for connecting a second group of said first junctor terminals to a third group of said first junctor terminals.

5. A communications switching network in accordance with claim 4 further comprising supervisory circuit means serially included in said third connecting means for supervising established connections between input terminals of said first group and input terminals of said second group.

6. A communications switching network in accordance with claim 4 further comprising a third switching portion serially included in said third connecting means, said third switching portion comprising an initial bidirectional switching stage with said second group of said first junctor terminals connected thereto, a last bidirectional switching stage with said third group of said second junctor terminals connected thereto and controllable switching means for selectively connecting said second group of first junctor terminals to said third group of second junctor terminals.

7. A communications switching network in accordance with claim 4 further comprising single cross-connection field means for selectively arranging said first, second and third connecting means in accordance with network traffic requirements.

8. A communications switching network comprising a first switching portion having line terminals, line junctor terminals and controllable switching means for connecting said line terminals to said line junctor terminals; a second switching portion comprising trunk terminals with bidirectional interoffice trunk circuits terminated thereon, trunk junctor terminals and controllable switching means for connecting said trunk terminals to said trunk junctor terminals; said trunk junctor terminals having a first group of said line junctor terminals directly connected thereto; and supervisory circuit means through which a second group of said line junctor terminals are connected to a third group of said line junctor terminals.

9. A communications switching network according to claim 8 further comprising a third switching portion interposed between said second group of line junctor terminals and said circuit means, said third switching portion controllable selectively to establish connections through said supervisory circuit means between said second group of line junctor terminals and said third group of line junctor terminals.

10. A communications switching network according to claim 8 further comprising junctor grouping frame means through which said first, second and third groups of line junctor terminals, said trunk junctor terminals and said circuit means are selectively cross-connected.

11. A communications switching network according to claim 10 further comprising a third switching portion having first junctor link terminals, second junctor link terminals and controllable switching means for connecting said first junctor link terminals to said second junctor link terminals; said first junctor link terminals having said circuit means directly connected thereto; and said second and third groups of line junctor terminals having said second junctor link terminals and said circuit means selectively cross-connected thereto through said junctor grouping frame means.

12. A multi-stage, space-division telephone switching network comprising a first sub-network having line and junctor terminals; a second sub-network having trunk and junctor terminals; a third sub-network having input and output junctor terminals; and central cross-connection means for interconnecting said junctor terminals; first of said first sub-network junctor terminals connected directly to certain of said second sub-network junctor terminals by said cross-connection means; and second of said first sub-network junctor terminals connected to third of said first sub-network junctor terminals by said cross-connection means and said third sub-network.

13. A multi-stage switching network comprising a first partially folded sub-network having junctor terminals, a second partially folded sub-network having junctor terminals, means including a cross-connection frame for serially connecting selected of said first and second sub-network junctor terminals, and a third sub-network having input and output terminals connected to other of said first sub-network junctor terminals by said connecting means.

References Cited by the Examiner

UNITED STATES PATENTS

| | | | |
|---|---|---|---|
| 2,585,904 | 2/1952 | Busch | 179—18 |
| 2,904,634 | 9/1959 | Dalhman et al. | 179—18 |
| 3,106,615 | 10/1963 | Spjeldnes | 179—18 |

FOREIGN PATENTS

| | | |
|---|---|---|
| 757,025 | 9/1956 | Great Britain. |

ROBERT H. ROSE, *Primary Examiner.*

S. H. BOYER, W. L. LYNDE, *Assistant Examiners.*